United States Patent [19]

Landers

[11] Patent Number: 5,277,993
[45] Date of Patent: Jan. 11, 1994

[54] SUBSTITUTE BATTERY DEVICE

[76] Inventor: Joseph R. Landers, 576 Madison Ave., Albany, N.Y. 12208

[21] Appl. No.: 27,567

[22] Filed: Mar. 5, 1993

Related U.S. Application Data

[63] Continuation of Ser. No. 623,108, Dec. 6, 1990, abandoned.

[51] Int. Cl.$^5$ ............................................. H07M 2/22
[52] U.S. Cl. ........................................ 429/10; 429/96; 429/121; 439/38
[58] Field of Search ................... 429/10, 121, 96, 100; 439/500, 620, 38–40; 335/302

[56] References Cited

U.S. PATENT DOCUMENTS

| 160,152 | 2/1875 | Bryan | 429/10 |
|---|---|---|---|
| 3,201,742 | 8/1965 | English | 429/121 X |
| 3,597,278 | 8/1971 | Brimer | 429/10 |
| 3,699,487 | 10/1972 | Steingroever | 335/302 |
| 3,748,185 | 7/1973 | Cooper et al. | 429/100 |
| 4,873,160 | 10/1989 | Miyazaki et al. | 429/100 X |
| 5,051,157 | 9/1991 | O'Brien et al. | 429/10 X |

OTHER PUBLICATIONS

*The New Encyclopedia Britannica*, vol. 7, p. 681, Article "Magnetic Pole", 15th Edition 1986.

Sears, Zemansky and Young; *College Physics* Fourth Edition; Addison-Wesley Publishing Company; p. 545, (Oct. 1975) 2nd Printing.

Primary Examiner—Stephen Kalafut
Attorney, Agent, or Firm—Heslin & Rothenberg

[57] ABSTRACT

The present invention comprises a device which may be used as a substitute for one or more of a plurality of DC batteries used as a power source. The device includes an electrically conducting elongated structure which is sized such that it forms an electrical contact with a DC battery contained in a battery compartment or a battery compartment. In one embodiment, the elongated structure includes a permanent magnet which is capable of replacing one or more of a plurality of DC batteries used as a power source and of extending the life of the batteries used. In an alternate embodiment, the elongated structure is electrically conducting.

6 Claims, 2 Drawing Sheets

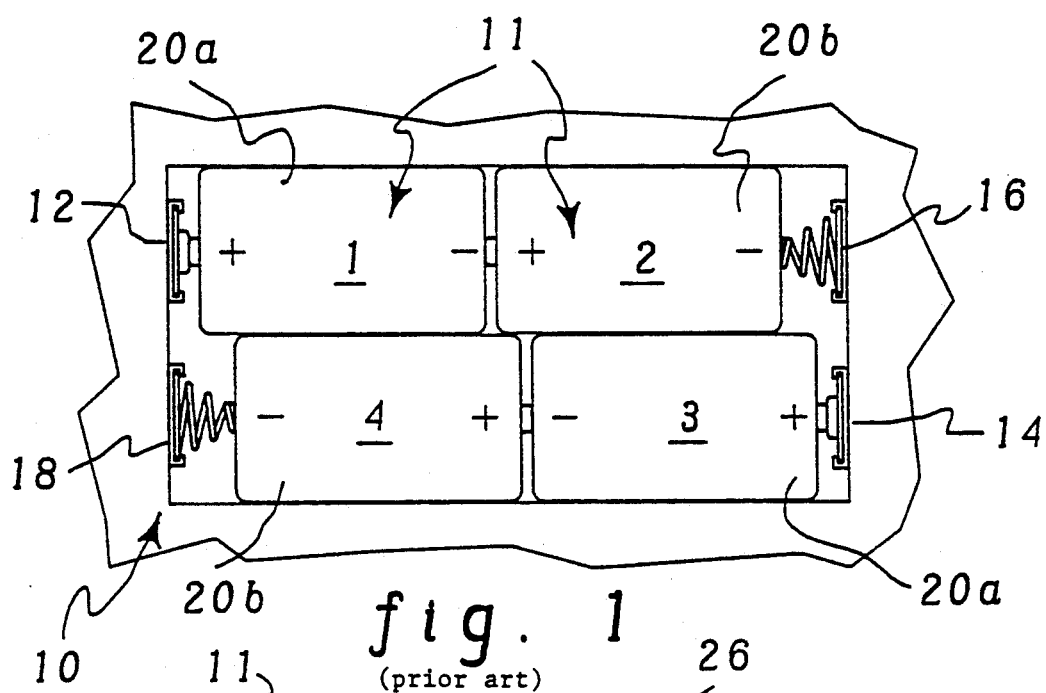
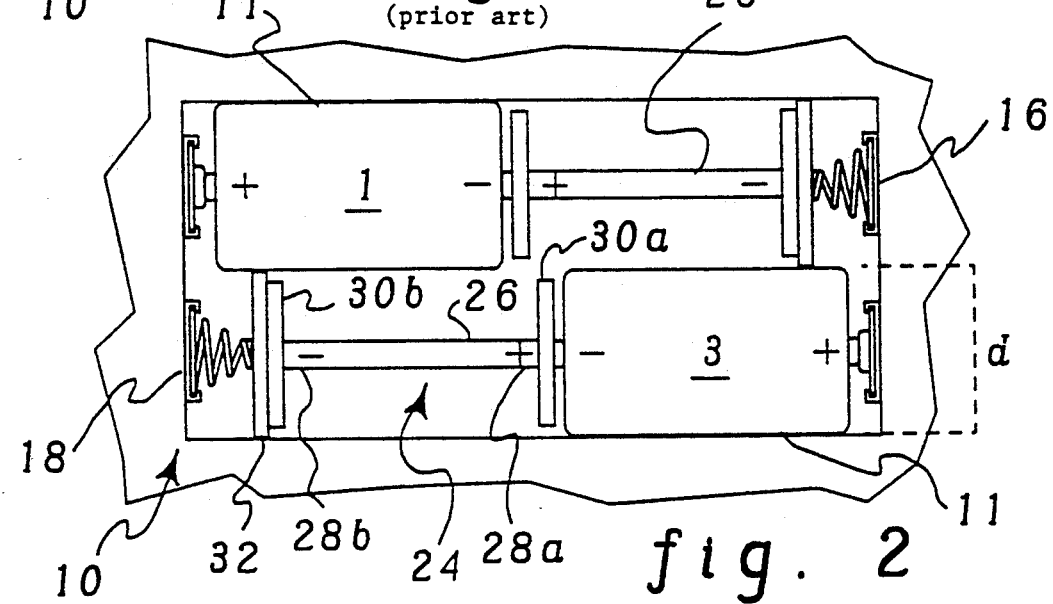
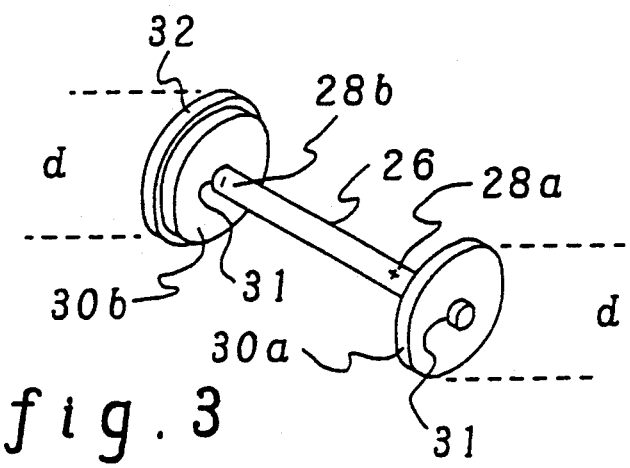

SUBSTITUTE BATTERY DEVICE

This application is a continuation of application Ser. No. 07/623,108, filed Dec. 6, 1990, now abandoned.

BACKGROUND OF THE INVENTION

1. Technical Field

The present invention relates generally to DC batteries and, more particularly, to a device which may be used as a substitute for a conventional dry cell DC battery.

2. Description of Background Art

Commonly, many devices such as a portable radio, flashlight or toy use DC batteries as power sources. A universal problem has existed since the advent of these batteries in that dry cell batteries have a limited operating life span and are usually not rechargeable. Once the energy in a conventional DC battery has been expended, its usefulness ceases and the battery must be discarded and replaced. Research continues to be conducted to develop batteries with extended life spans. This research has led to the relatively recent development of the alkaline battery. However, this battery will also eventually lose its energy and cease to operate. Therefore, problems associated with the use of conventional DC dry cell batteries still exist; that is, the device will not operate if the battery fails.

Therefore, a need still exists for a device which may replace one or more conventional DC batteries used as a power source. Further, a need exists for a device which may extend the life of a DC battery used as a power source.

SUMMARY OF THE INVENTION

Accordingly, a principal object of the present invention is to reduce the number of conventional DC batteries required to power a device. It is a further object of this invention to provide a substitute battery device which will increase the life of one or more conventional DC batteries when the conventional battery is used in a unit along with one or more battery replacements.

The substitute battery device of the present invention includes an elongated electrically conducting structure, which is positioned within a conventional battery compartment. The battery compartment further includes one or more conventional DC batteries each having a positive polarity at one end and a negative polarity at the other end. When the DC batteries and elongated structure of the present invention are properly placed within the battery compartment, an electrical connection is made which enables a unit to be powered.

As can be seen from the foregoing and the remaining portions of this specification which follow, the substitute battery device of the present invention enables one or more of a plurality of conventional DC batteries serving as a power source to be replaced with a more permanent device. With this invention, fewer conventional DC batteries will be needed to operate the unit and the life of the needed batteries will be prolonged.

BRIEF DESCRIPTION OF THE DRAWINGS

The subject matter which is regarded as the invention is particularly pointed out and distinctly claimed in the concluding portion of the specification. The invention, however, as to structure, together with further objects and advantages thereof, may best be understood by reference to the following description taken in conjunction with the accompanying drawings in which:

FIG. 1 illustrates one prior art embodiment of a plurality of conventional dry cell batteries positioned within a battery compartment;

FIG. 2 depicts a cut-away view of a battery compartment containing two battery replacement devices pursuant to the present invention;

FIG. 3 depicts a perspective view of one embodiment of a battery replacement device pursuant to the present invention;

DETAILED DESCRIPTION OF THE INVENTION

Figure 4A:
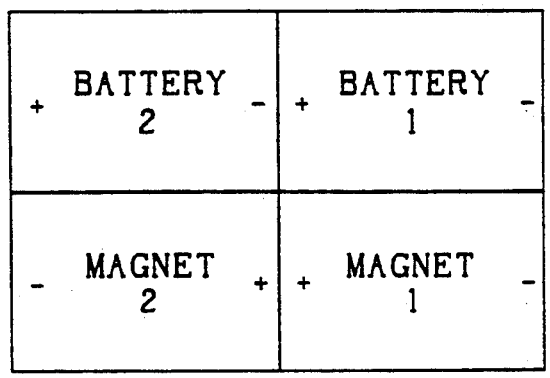
FIGS. 4a–4c illustrate various schematic representations for acceptable electrical arrangements of batteries and battery replacement devices.

FIG. 1 depicts a conventional battery compartment (10) for holding a plurality of dry cell DC batteries (11). In this prior art embodiment, battery compartment (10) is sized to hold, for example, four conventional DC batteries Size "C." However, it is to be understood that battery compartments of various sizes may be used with this invention without departing from the spirit of the invention and the scope of the claims presented herewith.

Battery compartment (10) contains a first flat metal contact (12), a second flat metal contact (14), a first spring contact (16), and a second spring contact (18). Conventional DC batteries (batteries 1 through 4) are positioned in such a manner that a proper electrical connection is made. That is, positive polarity end (20a) of battery 1 is placed against first metal contact (12) and negative polarity end (20b) of battery 2 is positioned against first spring contact (16). Adjacent to battery 1 and battery 2 are two more batteries which are positioned such that positive polarity end (20a) of battery 3 is placed against second flat metal contact (14) and negative polarity end (20b) of battery 4 is placed against second spring contact (18). This positioning, as is well known in the art, allows for an electrical contact to be made in order to power an electrical unit.

As shown in FIG. 2, pursuant to the present invention, battery compartment (11) is identical to the prior art battery compartment (10) described above. However, one or more of the conventional DC batteries is replaced by an elongated structure (24), manufactured pursuant to the present invention. Elongated structure (24) is sized such that it forms an electrical contact with either a conventional DC battery (11) or battery compartment (10), as described further below.

In one preferred embodiment, depicted in FIGS. 2 and 3, elongated structure (24) includes a permanent magnet (26). Permanent magnet (26) has a positive polarity (north magnetic pole) at one end (28a) and a negative polarity (south magnetic pole) at a second end (28b). Magnet (26), for example, is an ALNICO manufactured by Edmund Scientific Company, 101 East Gloucester Pike, Barrington, N.J. 08007-1380, and has a ½" diameter, a 1¾" length and a lift of 2½ lbs. centerless ground.

Elongated structure (24) further comprises a first non-metallic disc (30a), a second non-metallic disc (30b) and a metal plate (32). Discs (30a and 30b), for example, are made of plastic and are substantially the same diameter "d" as conventional battery (11) for maintaining magnet (26) in a properly centered position relative to conventional DC batteries (11) or battery compartment (10). Discs (30a and 30b) each include a hole (31) (FIG. 3) placed in the center of the disc sized to receive magnet (26). Magnet (26) extends through hole (31) in disc (30a or 30b) such that an electrical contact may be made between battery (11) and magnet (26), or between battery compartment (10) and magnet (26).

Adjacent to disc (30b) is a metal plate (32). Metal plate (32) is used to assist in making a contact with spring (16 or 18) (see FIG. 2) by providing a larger area in which the spring may meet with magnet (26). Metal plate (32) is also substantially the same diameter "d" as conventional battery (11), and it includes a hole in its center (not shown) for partially engageably receiving magnet (26) such that an electrical contact is formed.

It is believed that permanent magnets (26) function to circulate the electrolyte contained within batteries (11) when properly positioned relative thereto. It has been discovered that magnets (26) may be advantageously placed in battery compartment (10) in a variety of positions such that the electrolyte contained within the dry cell batteries is circulated. At this instance, several examples of these multiple positions will be described in reference to FIGS. 4a-4c. However, these examples are only illustrative. Many other positions are available which provide the same effects of powering a unit, extending the life of one or more batteries used in conjunction with the present invention and replacing one or more batteries.

As depicted in FIG. 4a, a first possible electrical connection is made by placing battery 1 in series with battery 2 and magnet 1 in series with magnet 2. As shown, in this instance, the positive polarity of battery 1 is connected to the negative polarity in battery 2 and the positive polarity in magnet 1 is connected to the positive polarity of magnet 2. This connection allows the electrolyte within the batteries to circulate, thereby improving the power delivered to a unit.

Figure 4B:
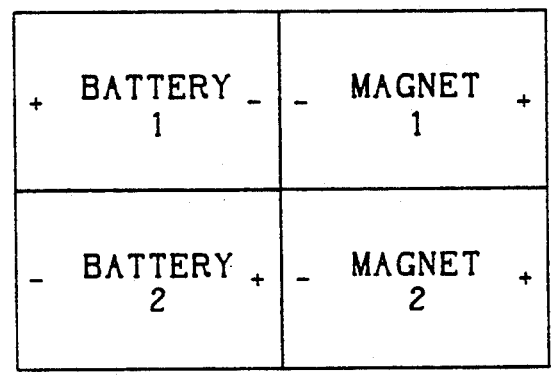

A further example of an acceptable arrangement is shown in FIG. 4b. In this embodiment, negative polarity of magnet 1 is serially connected with the negative polarity in battery 1 and the negative polarity of magnet 2 is connected in series with the positive polarity of battery 2.

Figure 4C:
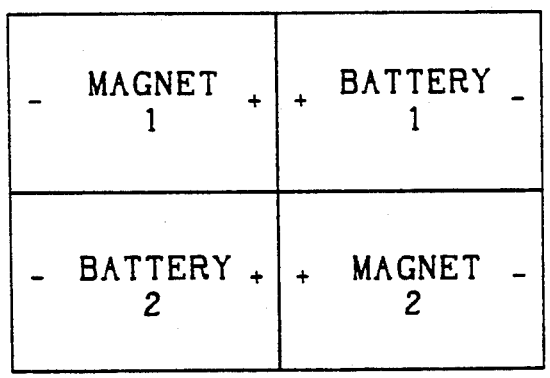

As yet another example, FIG. 4c depicts an arrangement wherein the positive polarity of battery 1 is connected in series with the positive polarity of magnet 1 and the positive polarity of magnet 2 is connected in series with the positive polarity of battery 2. As mentioned above, these examples simply provide an illustration of the multiple connections available with the present invention. Many other combinations are possible keeping within the spirit of the invention and the scope of the claims presented herewith.

Further, while a battery compartment sized to hold four dry cell DC batteries has been described herein, it is within the scope of this invention to include battery compartments of many other sizes and shapes. For instance, the battery replacement device of the present invention may be used as described above with battery compartments capable of holding two, three, or six batteries.

Figure 5:
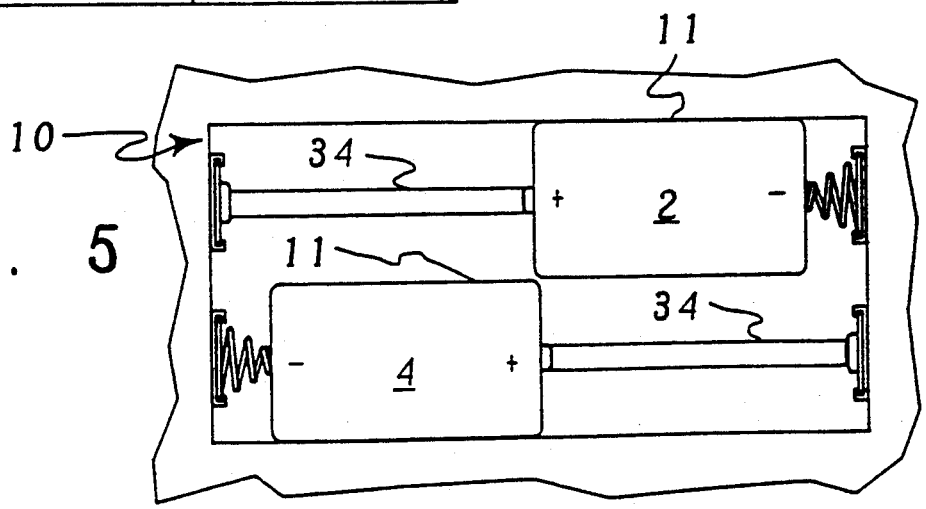
FIG. 5 illustrates a cut-away view of a battery compartment containing an alternate embodiment of two battery replacements pursuant to the present invention.

In an alternate embodiment of the present o invention, an elongated structure (24') includes an electrically conducting copper insert (34) (see FIG. 5). Copper insert (34) is manufactured, for example, of solid copper and is machined such that it is sized to form an electrical contact with either conventional DC battery (11) or battery compartment (10). As with permanent magnet (26) previously described, copper insert (34) may be used as a replacement for one or more conventional DC batteries (11). However, unlike permanent magnet (26), copper insert (34) does not have a positive or negative polarity at either of the ends.

In a further embodiment, not shown, copper insert (34) includes a first non-metallic disc at a first end, a second non-metallic disc at a second end and a metal plate at one end, similar to those described above in relation to permanent magnet (26). As previously described, the non-metallic discs are substantially the same diameter as the conventional battery or batteries used to power the specific unit and are used to maintain proper center positioning of copper insert (34) within a battery compartment. The metal plate is used, as described above, to aid in making a proper electrical connection.

In yet another embodiment, not shown, a combination of magnet (26) and copper insert (34) may be used along with a conventional DC battery for powering a unit. For example, in the embodiment depicted in FIG. 2, one of magnets (26) may be replaced by copper insert (34).

The present invention, several embodiments of which have been described herein, enables a conventional DC battery to be replaced by a more permanent structure such as a permanent magnet or a copper insert. The use of one or more permanent magnets or one or more copper inserts with one or more conventional DC batteries will provide power to a unit. Further, the use of the magnets will extend the life of the conventional DC batteries also used to power the unit.

Although preferred embodiments have been depicted and described in detail herein, it will be apparent to those skilled in the relevant art that various modifications, additions, substitutions and the like can be made without departing from the spirit of the invention, and these are, therefore, considered to be within the scope of the invention as defined in the appended claims.

What is claimed is:

1. A substitute battery device for a battery powered apparatus capable of operating using conventional dry cell DC batteries within a battery compartment, said conventional batteries each having a positive polarity at one end and a negative polarity at the other end, said device comprising at least one dry cell DC battery; and a permanent magnet sized and positioned within said battery compartment to form an electrical contact with said at least one dry cell DC battery and with said battery compartment.

2. The device of claim 1, wherein said permanent magnet includes a first end and a second end, each of said ends being sized to electrically engage one of said conventional battery and said battery compartment when said permanent magnet is positioned within said battery compartment.

3. The device of claim 2, wherein said permanent magnet includes a first non-metallic disc having an inner surface and an outer surface, said first non-metallic disc circumferentially surrounding said permanent magnet at said first end, a second non-metallic disc having an inner surface and an outer surface, said second non-metallic disc circumferentially surrounding said permanent magnet at said second end, said first non-metallic disc and said second non-metallic disc facilitating proper maintenance of said permanent magnet within said battery compartment.

4. The device of claim 3, wherein said permanent magnet includes a metal plate circumferentially surrounding said permanent magnet at one of said first end and said second end, said metal plate being positioned adjacent said outer surface of a corresponding one of said first non-metallic disc and said second non-metallic disc, said metal plate electrically contacting one of said conventional batteries and said battery compartment when positioned within said battery compartment.

5. The device of claim 3, wherein said first non-metallic disc and said second non-metallic disc are manufactured of plastic.

6. The device of claim 1, wherein said permanent magnet includes a first end and a second end, said first end having a north magnetic pole and said second end having a south magnetic pole.

* * * * *